United States Patent Office 3,644,518
Patented Feb. 22, 1972

3,644,518
PROCESS FOR THE PRODUCTION OF
NAPHTHAMIDE DERIVATIVES
Makoto Yoshida, 15 Nakajima, Kanagawa-ken, Odawara-shi, Japan, and Akio Okumura, 1247 Yoshihama, Yogawara-machi, Kanagawa-ken, Japan
No Drawing. Continuation-in-part of application Ser. No. 458,403, May 24, 1965. This application Aug. 1, 1968, Ser. No. 749,340
Int. Cl. C07c 103/30
U.S. Cl. 260—559       11 Claims

ABSTRACT OF THE DISCLOSURE

A process for preparing 1-hydroxy-2-naphthamido derivatives, from the corresponding nitrile and a 1-hydroxy-2-naphthoic acid aryl ester in the presence of a reduction catalyst, in a single step with a high yield.

---

This application is a continuation-in-part of our application Ser. No. 458,403 filed May 24, 1965.

This invention relates to a novel process for the production of 1-hydroxy-2-naphthamide derivatives. More particularly, it relates to the process for the production of a compound represented by the general formula:

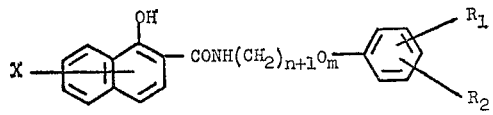

wherein $R_1$ and $R_2$, which may be same or different, represent a member selected from the group consisting of hydrogen, a halogen atom, an alkyl group, an acylamino group, a carboxyl group; X represents a member selected from the group consisting of hydrogen and a halogen atom; $n$ is a cardinal number including zero, $m$ is a cardinal number including zero, and when $n$ is zero, $m$ is zero.

The 1-hydroxy-2-naphthamide derivatives are known compounds having known utility. For example, these derivatives are useful as dyes, medicines, agricultural chemicals, couplers for color photography, etc., as well as intermediates for various syntheses. Thus these derivatives are described in U.S. Pats. 2,474,293 and 3,002,836 which disclose a method of preparation of these derivatives in which nitrile compounds are reduced to corresponding amines, and these amino compounds are condensed with 1-hydroxy-2-naphthoicacidphenylester. This method is illustrated as follows:

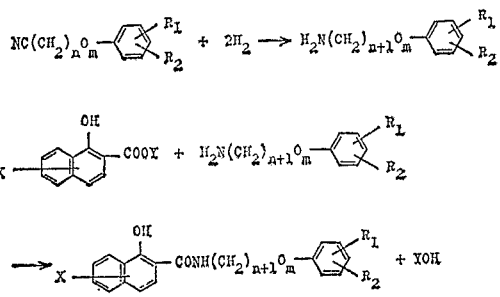

wherein $R_1$, $R_2$, X, $n$ and $m$ are defined as above, and Y is an aryl group. This method can, however, only be used satisfactorily in cases where the amino compound can be easily synthesized, separated and purified in good yields from the corresponding nitrile compounds, and where the condensation reaction between the amino compound and the ester easily proceeds in good yields.

In U.S. Pat. 2,589,004 is described the method of preparation in which there is first a condensation reaction between an amino compound of the formula

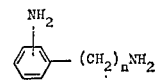

in which $n$ is a positive integer) and a naphthoic acid phenylester, and then an acid chloride and the like is reacted with the residual amino group. It is mentioned that, in this case, the aliphatic amino group reacts selectively owing to its higher reactivity than that of aromatic amino group. In this case, however, the amino compound must first be synthesized, separated and purified in good yields, and moreover, the condensation reaction with ester compound must be carried out smoothly. Moreover, in this method, the preparation of a pure product is difficult, since some parts of aromatic amino groups react with esters to produce a byproduct. Further, when an acid chloride or acid anhydride is used to react with free amino groups of the resultant 1-hydroxy-naphthamide, the hydroxy group of the naphthol ring also reacts with these reagents to give a by-product. Consequently, it is difficult to produce pure product in good yields.

In the processes mentioned above, a two step reaction process is necessary, and the yields of the product are inevitably lowered. It is also known that in the production of an amino compound by the catalytic reduction of a nitrile compound, secondary amines are also generally produced as a by-product, which results in a reduction in the yield of primary amine, and often makes the separation and purification of the product difficult.

Many attempts have been made to overcome these difficulties. For instance, in "The Journal of the American Chemical Society, vol. 47, page 3051," there is described the method in which a nitrile compound is catalytically reduced in the presence of an acid anhydride or an ester compound to produce an acid amide compound in a single step.

In particular, in U.S. Pat. 2,232,598 there is described the method in which nitrile compounds are catalytically reduced in the presence of an ester compound to produce acrylamido compounds. The claims of this patent cover all ester compounds, and in this patent many kinds of esters are mentioned. The ester compounds actually used in the examples, however, are limited to alkyl esters. Indeed, only methyl formate or ethyl formate is used in five of the examples, and only one example shows the use of ethyl acetate. In the example in which ethyl acetate is used, yields of the product are not described. We repeated this process, however, and the reactivity of ethyl acetate toward amino compounds was so low that yields of the product were very small. This demonstrates that ether compounds that result in high yields of products are limited to ester compounds, such as formic acid esters are lactic acid esters, whose molecular weights are low, and whose reactivity towards amino compounds is high. In order to produce the aforementioned 1-hydroxy-naphthamide compounds, the corresponding nitrile compound was catalytically reduced in the presence of 1-hydroxy-2-naphthoic acid alkyl esters, but the yields of product were so low that it was not advantageous.

It is, therefore, an object of the present invention to produce the aforementioned 1-hydroxy-2-naphthamido compound, from the corresponding nitrile compound and a 1-hydroxy-2-naphthoic acid derivative in a single step with a high yield.

This object is accomplished by the process in which the nitrile compound is catalytically reduced in the presence of the 1-hydroxy-2-naphthoic acid aryl ester by using nickel, cobalt, palladium or platinum catalyst.

The method of this invention has the advantage that the primary amino compound produced by the reduction of the nitrile compound does not need to be isolated from the reaction mixture and that, if a suitable solvent is used, the desired naphthamide derivative can be crystallized from a solution in which the reaction has been finished, by dissolving the precipitated product by heating and, after removing the catalyst by filtering, cooling the solution to crystallize and obtaining the desired compound directly by filtering. Hence, the method of this invention provides a simplified procedure for the production of naphthamide derivatives. In other words, whilst the conventional synthesis for naphthamide derivatives requires two steps to reduce the nitrile compound to the corresponding primary amine and to condense the thus formed primary amine with an ester thereby requiring a long period of time, the method of this invention enables the synthesis of the naphthamide derivative to be conducted in a single step in a short period of time using an autoclave and, therefore, the procedure can be considerably simplified.

On comparing the total yields for obtaining the desired naphthamide derivative from a nitrile compound by the method of this invention with those of a conventional method, it will be seen that the yields by the method of this invention are about 2.5 to 3.5 times as high as those by the conventional two-step process.

In an embodiment of this invention, the desired product can be produced by the following general procedure:

An aryl ester of 1-hydroxy-2-naphthoic acid or an aryl ester of a derivative of the said acid is placed together with a nitrile compound in a shaking-type autoclave. If necessary, an appropriate inert organic solvent such as methanol, ethanol, isopropanol, tertiary-butanol, tetrahydrofuran, dioxane, dimethylformamide, ether, cyclohexane, carbontetrachloride, n-hexane, methyl cyclohexane, or methyl cellosolve may be used. In particular, dimethylformamide and tertiary-butanol are desirable. The use of the ester compound more than an equivalent amount, to a nitrile compound, is desirable. Practically, the use of 1 to 3 moles of an ester to one mole of a nitrile compound may be desirable.

As the catalyst, nickel, cobalt, platinum or palladium catalyst can be used. In particular, Raney cobalt and Raney nickel catalyst are desirable.

The reaction proceeds at a pressure below 20 kg./cm.$^2$ and above 200 kg./cm.$^2$. However, considering the reaction rate, and the mechanical problem of the apparatus, a pressure in the range of 20 to 200 kg./cm.$^2$ is desirable. Even if the reaction starts at low temperature below 50° C., it proceeds slowly, since this reaction is exothermic reaction, and it proceeds faster at higher temperature. Consequently, considering the reaction rate and the apparatus for heating, a temperature in the range of 50° to 200° C. is desirable.

The addition of a small amount of a basic compound, such as ammonia, pyridine and tri-ethylamine, may be effective when some nitrile compounds are used, but the addition of such a compound is in general unnecessary. When the reaction is complete, the product is recovered, heated with the addition of a suitable solvent to dissolve the product, and the catalyst is removed from the solution by filtration. By concentrating, if necessary, and cooling the filtrate, the desired compound can be obtained.

The invention is illustrated by the following examples.

EXAMPLE 1

In a 500 ml. shaking type autoclave there were placed 52.8 g. (0.2 mole) of 1-hydroxy-2-naphthoic acid phenyl ester, 26.2 g. (0.2 mole) of O-methylphenyl acetonitrile, 150 ml. of ethanol and 5 g. of Raney nickel, and then hydrogen was fed into the autoclave until the pressure reached 57 kg./cm.$^2$. The autoclave was heated to 100° C. for 4 hours. After the reaction, the catalyst was removed by filtration. The filtrate was concentrated to 100 ml. and cooled. The resultant precipitate was collected by filtration, and recrystallized from 100 ml. of alcohol and 20 ml. of dimethyl formamide to give 35 g. (57% yield) of 1-hydroxy-N-(O-methylphenethyl)-2-naphthamide. The melting point of the product was 129–130° C.

EXAMPLE 2

In a 500 ml. shaking-type autoclave there were placed 52 g. (0.2 mole) of 1-hydroxy-2-naphthoic acid phenyl ester, 35 g. (0.2 mole) of O-acetaminophenyl-acetonitrile, 100 ml. of ethanol and 5 g. of Raney nickel, and then hydrogen was fed to 77 kg./cm.$^2$. The autoclave was heated to 100° C. for 4.5 hours. After cooling to room temperature, the pressure of hydrogen became 52 kg./cm.$^2$. The reaction mixture was dissolved in 120 ml. of dimethylformamide by heating. The catalyst was removed by filtration. The filtrate was cooled. The resultant precipitate was collected by filtration, and washed with ethyl acetate to give 38 g. (56% yield) of 1-hydroxy-N-(O-acetaminophenylethyl)-2-acetamide. The product was sufficiently pure not to need recrystallization. The melting point of the product was 222–223° C.

EXAMPLE 3

By repeating the procedure described in Example 2 using 59 g. (0.2 mole) of 1-hydroxy-4-chloro-2-naphthoic acid phenyl ester instead of 1-hydroxy-2-naphthoic acid phenyl ester used in Example 2, there was obtained 30 g. (40% yield) of 1-hydroxy-4-chloro-N-(O-acetamidephenethyl)-2-naphthamide. The melting point of the product was 210–211° C.

EXAMPLE 4

By repeating the procedure described in Example 2 using 5 g. of Raney cobalt catalyst instead of the Raney nickel catalyst used in Example 2. There was obtained 40 g. (59% yield) of 1-hydroxy-N-(O-acetamidephenethyl)-2-naphthamide.

EXAMPLE 5

In a 500 ml. shaking-type autoclave there were placed 66 g. (0.25 mole) of 1-hydroxy-2-naphthoic acid phenyl ester, 35 g. (0.2 mole) of O-acetaminophenyl-acetonitrile, 100 ml. of dimethylformamide and 5 g. of Raney cobalt, and then hydrogen was fed into the autoclave until the pressure reached 50 kg./cm.$^2$. The autoclave was then heated to 120° C. and reacted for 3 hours. After cooling to room temperature, the pressure of hydrogen dropped to 31 kg./cm.$^2$. The reaction mixture was filtered to remove the catalyst, and then 100 ml. of methanol was added. The resultant solution was cooled. The precipitated product was collected by filtration, and washed with 40 ml. of ethyl acetate to give 52 g. (76% yield) of 1-hydroxy-N-(O-acetaminophenethyl)-2-naphthamide.

EXAMPLE 6

By repeating the procedure described in Example 2 using 0.5 g. of platinum oxide instead of Raney nickel used in Example 2, there was obtained 36 g. (53% yield) of 1-hydroxy-N-(O-acetaminophenethyl)-2-naphthamide.

EXAMPLE 7

The procedure described in Example 2 was repeated using 3 g. of palladium carbon catalyst instead of Raney nickel and using an initial hydrogen pressure of 90 kg./cm.$^2$. There was obtained 34 g. (50% yield) of 1-hydroxy-N-(O-acetaminophenethyl)-2-naphthamide.

EXAMPLE 8

By repeating the procedure described in Example 5 using 36.5 g. (0.2 mole) of m-sulfobenzonitrile instead of O-acetaminophenyl-acetonitrile, used in Example 5, there was obtained 37 g. (52% yield) of 1-hydroxy-N-(m-sulfobenzyl)-2-naphthamide, the melting point of the product being above 250° C.

EXAMPLE 9

By repeating the procedure described in Example 5 using 29.5 g. (0.2 mole) of p-cyano-benzoic acid instead of O-acetaminophenyl-acetonitrile, used in Example 5, there was obtained 36 g. (56% yield) of 1-hydroxy-N-(p-carboxybenzyl)-2-naphthamide, the melting point of the product being 237–239° C.

EXAMPLE 10

By repeating the procedure described in Example 5 using 27 g. of p-methoxybenzonitrile, instead of O-acetaminophenyl-acetonitrile used in Example 5, there was obtained 37.5 g. (61% yield) of 1-hydroxy-N-(p-methoxybenzyl)-2-naphthamide, the melting point of the product being 143–145° C.

EXAMPLE 11

By repeating the procedure described in Example 5 using 32 g. of p-N-methylcarbamoyl-benzonitrile instead of O-acetaminophenyl-acetonitrile, and 100 ml. of tertiary-butanol instead of dimethylformamide, there was obtained 39 g. (58.5% yield) of 1-hydroxy-N-(p-methylcarbamoylbenzyl) 2-naphthamide, the melting point of the product being 232–233° C.

EXAMPLE 12

By repeating the procedure described in Example 2, using 35 g. of β-(O-acetaminophenyl)-propionitrile instead of O-acetaminophenyl-acetonitrile used in Example 2, there was obtained 43 g. (60% yield) of 1-hydroxy-N-(ω-(o-acetaminophenyl)-propyl) - 2 - naphthamide, the melting point of the product being 173–175° C.

EXAMPLE 13

By repeating the procedure described in Example 5 using 42 g. (0.2 mole) of 2-acetamino-4-chlorophenyl-acetonitrile instead of O-acetaminophenyl-acetonitrile used in Example 5, there was obtained 42 g. (55% yield) of 1-hydroxy - N - (2-acetamino-4-chloro-phenethyl)-2-naphthamide, the melting point of the product being 189–190° C.

EXAMPLE 14

In a 500 ml. shaking-type autoclave there were placed 15 g. (0.05 mole) of ω-(2,4-di-tertiary-amyl-phenoxy)-butyronitrile, 13.2 g. (0.05 mole) of 1-hydroxy-2-naphthoic acid phenylester, 100 ml. of tertiary-butanol and 2 g. of Raney cobalt, and then hydrogen was fed into the autoclave until the pressure reached 95 kg./cm.². The autoclave was then heated to 120° C., and reacted for 4 hours. The reaction mixture was filtered to remove the catalyst. The resultant solution was evaporated, and precipitated product was collected by filtration. After the recrystalliation from methanol 17.2 g. (72% yield) of 1-hydroxy - N - (ω-(2,4-tertiary-amylphenoxy)-butyl)-2-naphthamide was obtained. The melting point of the product was 125–126° C.

COMPARATIVE EXAMPLE 1

In a 1000 ml. shaking-type autoclave there were placed 87 g. (0.5 mole) of O-acetaminophenyl-acetonitrile, 300 ml. of ethanol containing ammonia and 5 g. of Raney nickel, and then hydrogen was fed into the autoclave until the pressure reached 80 kg./cm.². The mixture contained in the autoclave was then reacted for 3 hours while maintaining the temperature at 100° C. After the reaction, the catalyst was removed by filtration and the filtrate was concentrated under reduced pressure on a steam bath to give an oily product. On purifying the oily product by high-vacuum distillation, there were obtained 54 g. (61%) of O-acetaminophenethylamine having a boiling point of 165°–172° C./10⁻² mm. Hg.

In a 500 ml. flask there were placed 36 g. (0.2 mole) of the thus obtained O-acetaminophenethylamine and 53 g. (0.2 mole) of the phenyl ester of 1-hydroxy-2-naphthoic acid and the mixture then heated for 1 hour at 170° C. in an oil bath while distilling off phenol formed in the reaction under reduced pressure. After the reaction was finished, the product was boiled under reflux with the addition of 300 ml. of methanol, cooled, and the deposited precipitate collected by filtration. On recrystallizing the thus obtained precipitate from a mixture of alcohol and dimethylformamide, there was obtained 25 g. (33%) of 1 - hydroxy - N - (O-acetaminophenethyl)-2-naphthamide having a melting point of 222–223° C.

COMPARATIVE EXAMPLE 2

The procedure described in Example 2 was repeated, but 1-hydroxy-2-naphthoic acid methyl and ethyl ester were used instead of the phenyl ester used in Example 2. However, only trace amounts of the desired product, 1 - hydroxy - N - (O-acetamidephenethyl) - 2-naphthamide were produced.

It can be seen that the yield of the naphthamide derivative, based on the nitrile compound, in Comparative Example 1 was 20%, which was about ⅓ of the yields in Examples 2 and 3. Also, it will be appreciated that the procedure employed in the Comparative Example 1 was complicated when compared with the procedure described in Examples 1 to 14.

Examples 15–35 illustrate production of other naphthamide derivatives using the procedure described in Example 2 and are tabulated in the following Table.

| Example No. | Reactants | | Resultant naphthamide derivative | Melting point of the product, ° C. |
|---|---|---|---|---|
| | Nitrile compound | Ester compound | | |
| 15 | NC—⟨phenyl⟩—NHCOCH₃ | ⟨1-hydroxy-2-naphthyl⟩-COO—⟨phenyl⟩ (OH) | ⟨1-hydroxy-2-naphthyl⟩-CONHCH₂—⟨phenyl⟩ (OH) | 117–118 |
| 16 | NC—⟨phenyl⟩—NHCOCH₃ | Same as above | ⟨1-hydroxy-2-naphthyl⟩-CONHCH₂—⟨phenyl⟩—NHCOCH₃ (OH) | 215–216 |

| | Reactants | | Resultant naphthamide derivative | Melting point of the product, °C. |
|---|---|---|---|---|
| | Nitrile compound | Ester compound | | |
| 17 | 4-(NHSO₂CH₃)-phenyl-NC | ...do... | 2-hydroxy-naphthalene-3-CONHCH₂-C₆H₄-NHSO₂CH₃ | 171-172 |
| 18 | 2-methyl-phenyl-NC | ...do... | 2-hydroxy-naphthalene-3-CONHCH₂-(2-CH₃-C₆H₄) | 122-123 |
| 19 | 2-chloro-phenyl-NC | ...do... | 2-hydroxy-naphthalene-3-CONHCH₂-(2-Cl-C₆H₄) | 124-125 |
| 20 | 2,5-dimethyl-phenyl-NC | ...do... | 2-hydroxy-naphthalene-3-CONHCH₂-(2,5-(CH₃)₂-C₆H₃) | 134-135 |
| 21 | NCCH₂-C₆H₅ | ...do... | 2-hydroxy-naphthalene-3-CONH(CH₂)₂-C₆H₅ | 123-124 |
| 22 | 2-(NHCOC₂H₅)-phenyl-CH₂-NC | ...do... | 2-hydroxy-naphthalene-3-CONH(CH₂)₂-(2-NHCOC₂H₅-C₆H₄) | 218-219 |
| 23 | 4-(NHCOCH₃)-phenyl-CH₂-NC | ...do... | 2-hydroxy-naphthalene-3-CONH(CH₂)₂-(4-NHCOCH₃-C₆H₄) | 226-227 |
| 24 | 2-(NHSO₂CH₃)-phenyl-CH₂-NC | ...do... | 2-hydroxy-naphthalene-3-CONH(CH₂)₂-(2-NHSO₂CH₃-C₆H₄) | 148-150 |

| | Reactants | | Resultant naphthamide derivative | Melting point of the product °C. |
|---|---|---|---|---|
| | Nitrile compound | Ester compound | | |
| 25 | NCCH₂―⌬―NHSO₂CH₃ | do | 2-hydroxy-N-[2-(4-methanesulfonamidophenyl)ethyl]-1-naphthamide (OH, CONH(CH₂)₂―⌬―NHSO₂CH₃) | 192–194 |
| 26 | NCCH₂―⌬―NHSO₂―⌬ | do | (OH, CONH(CH₂)₂―⌬―NHSO₂―⌬) | 163–164 |
| 27 | NCCH₂―⌬―NHSO₂―⌬ | do | (OH, CONH(CH₂)₂―⌬―NHSO₂―⌬) | 228–229 |
| 28 | NCCH₂―⌬―NHSO₂―⌬―CH₃ | (OH, COO―⌬) | (OH, CONH(CH₂)₂―⌬―NHSO₂―⌬―CH₃) | 199–200 |
| 29 | NC―⌬ | (OH, Cl, COO―⌬) | (OH, Cl, CONHCH₂―⌬) | 135–136 |
| 30 | Same as above | (OH, Br, COO―⌬) | (OH, Br, CONHCH₂―⌬) | 139–140 |
| 31 | NCCH₂―⌬ | (OH, Cl, COO―⌬) | (OH, Cl, CONH(CH₂)₂―⌬) | 101–103 |

We claim:
1. A process for producing a compound represented by the formula:

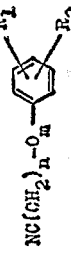

ess comprises heating under hydrogen pressure a nitrile compound represented by the formula:

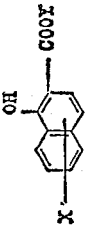

wherein $R_1$, $R_2$, $n$ and $m$ are defined as above, with a 1-hydroxy-2-naphthoic acid ester represented by the formula

wherein X is defined as above and Y is an aryl group, in the presence of a reduction catalyst selected from the group consisting of nickel, cobalt, platinum and palladium and in the absence of a solvent or the presence of an inert solvent.

2. A process according to claim 1 wherein the reaction is carried out at a temperature in the range of from 50 to 200° C.

3. A process according to claim 1, wherein the reaction is carried out at a hydrogen pressure in the range of from 20 to 200 kg./cm.$^2$.

4. A process according to claim 1, wherein the molar ratio of the ester compound to the nitrile compounds, is 1:1 to 3:1.

5. A process according to claim 1, wherein the reaction is carried out in an organic inert solvent.

6. A process according to claim 1, wherein the reaction is carried out in an organic inert solvent selected from wherein $R_1$ and $R_2$ represent a member selected from the group consisting of a hydrogen atom, a halogen atom, an alkyl group, an acylamino group, carboxyl group, an alkoxy group, a N-alkylcarbamoyl group and sulfo group; X represents a member selected from the group consisting of a hydrogen atom and a halogen atom; $n$ is a cardinal number including zero, $m$ is a cardinal number including zero, said $m$ being zero when said $n$ is zero, which procthe group consisting of methanol, ethanol, isopropanol, tetra-hydrofuran, dioxane, ether, cyclohexane, carbontetrachloride, n-hexane, methyl cyclohexane, and methyl Cellosolve.

7. A process according to claim 1, wherein the reaction is carried out in tertiary-butanol.

8. A process according to claim 1 wherein the reaction is carried out in dimethylformamide.

9. A process according to claim 1 for producing the compound of the formula

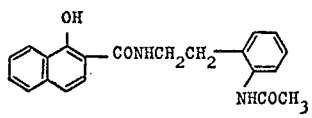

in which the nitrile compound is represented by the formula

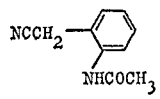

and the ester is represented by the formula

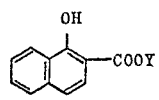

wherein Y is an aryl group.

10. A process according to claim 1 for producing the compound of the formula

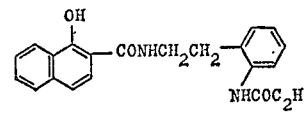

in which the nitrile compound is represented by the formula

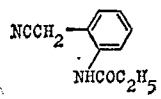

and the ester is represented by the formula

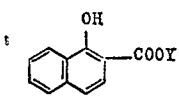

wherein Y is an aryl group.

11. A process according to claim 1 for producing the compound of the formula

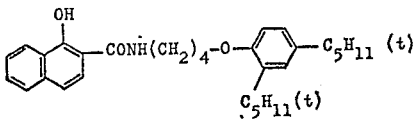

in which the nitrile compound is represented by the formula

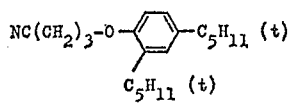

and the ester is represented by the formula

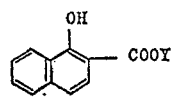

wherein Y is an aryl group.

References Cited
UNITED STATES PATENTS 2,474,293   6/1949   Weissberger et al. ---- 260—559
2,232,598   2/1941   Farlow ------------- 260—561

HENRY R. JILES, Primary Examiner
H. I. MOATZ, Assistant Examiner

U.S. Cl. X.R.
260—519, 507 R